(12) United States Patent
Smith et al.

(10) Patent No.: US 11,170,004 B2
(45) Date of Patent: Nov. 9, 2021

(54) MACHINE LEARNING EDITORIAL PAIRING WITH PREDICTIVE QUERIES INFLUENCING USER BEHAVIOR

(71) Applicant: UNBLOCKABLE, INC., Santa Monica, CA (US)

(72) Inventors: Eben Smith, Santa Monica, CA (US); Greg Dean, Santa Monica, CA (US); Gianni Settino, Santa Monica, CA (US); Jesse Pizarro, Los Angeles, CA (US); Taylor Tanita, Venice, CA (US)

(73) Assignee: UNBLOCKABLE, INC., Santa Monica, CA (US)

( * ) Notice: Subject to any disclaimer, the term of this patent is extended or adjusted under 35 U.S.C. 154(b) by 0 days.

(21) Appl. No.: 17/006,547

(22) Filed: Aug. 28, 2020

(65) Prior Publication Data

US 2020/0394198 A1    Dec. 17, 2020

Related U.S. Application Data

(63) Continuation-in-part of application No. 16/719,825, filed on Dec. 18, 2019.

(60) Provisional application No. 62/914,963, filed on Oct. 14, 2019, provisional application No. 62/885,512, filed on Aug. 12, 2019, provisional application No. 62/830,157, filed on Apr. 5, 2019.

(51) Int. Cl.
*G06F 16/2457*    (2019.01)
*G06N 20/00*    (2019.01)
*G06F 16/248*    (2019.01)
*G06F 16/25*    (2019.01)

(52) U.S. Cl.
CPC ...... *G06F 16/24575* (2019.01); *G06F 16/248* (2019.01); *G06F 16/252* (2019.01); *G06N 20/00* (2019.01)

(58) Field of Classification Search
CPC ............ G06F 16/24575; G06F 16/248; G06F 16/252; G06N 20/00
USPC ......................................................... 463/42
See application file for complete search history.

(56) References Cited

U.S. PATENT DOCUMENTS

| | | | | |
|---|---|---|---|---|
| 8,449,361 | B2 * | 5/2013 | Laycock ................. | A63F 13/46 463/9 |
| 8,858,313 | B1 * | 10/2014 | Selfors .................... | A63F 13/65 463/9 |
| 9,028,260 | B2 | 5/2015 | Nanjiani et al. | |
| 9,870,674 | B2 | 1/2018 | Hayon | |
| 2009/0061978 | A1 | 3/2009 | Ahlin | |
| 2012/0142428 | A1 | 6/2012 | Wilson et al. | |

(Continued)

*Primary Examiner* — Allen Chan
(74) *Attorney, Agent, or Firm* — Perkins Coie LLP

(57) ABSTRACT

Disclosed herein is an application enabling users to interface dynamically with live sports. Algorithmic generation of user-tailored editorial content that influences sports-bettor behavior, to increase engagement and manage risk. By showing bettors editorial content that could influence the side of the bet they might wish to take (for example, by pointing out that a certain player is playing particularly well or poorly), a sportsbook can influence the ratio of bets (or better, dollars wagered) on either side of a given event. On a more individual level, by showing users content that increases their engagement—such as content about a favorite player or local team, for example—the book can increase a user's propensity to bet in general, with a good sense for which types of bet the user is likely to favor.

22 Claims, 10 Drawing Sheets

(56) References Cited

U.S. PATENT DOCUMENTS

| | | |
|---|---|---|
| 2014/0162742 A1 | 6/2014 | Dempsey |
| 2015/0024814 A1 | 1/2015 | Root |
| 2017/0003740 A1 | 1/2017 | Verfaillie et al. |

* cited by examiner

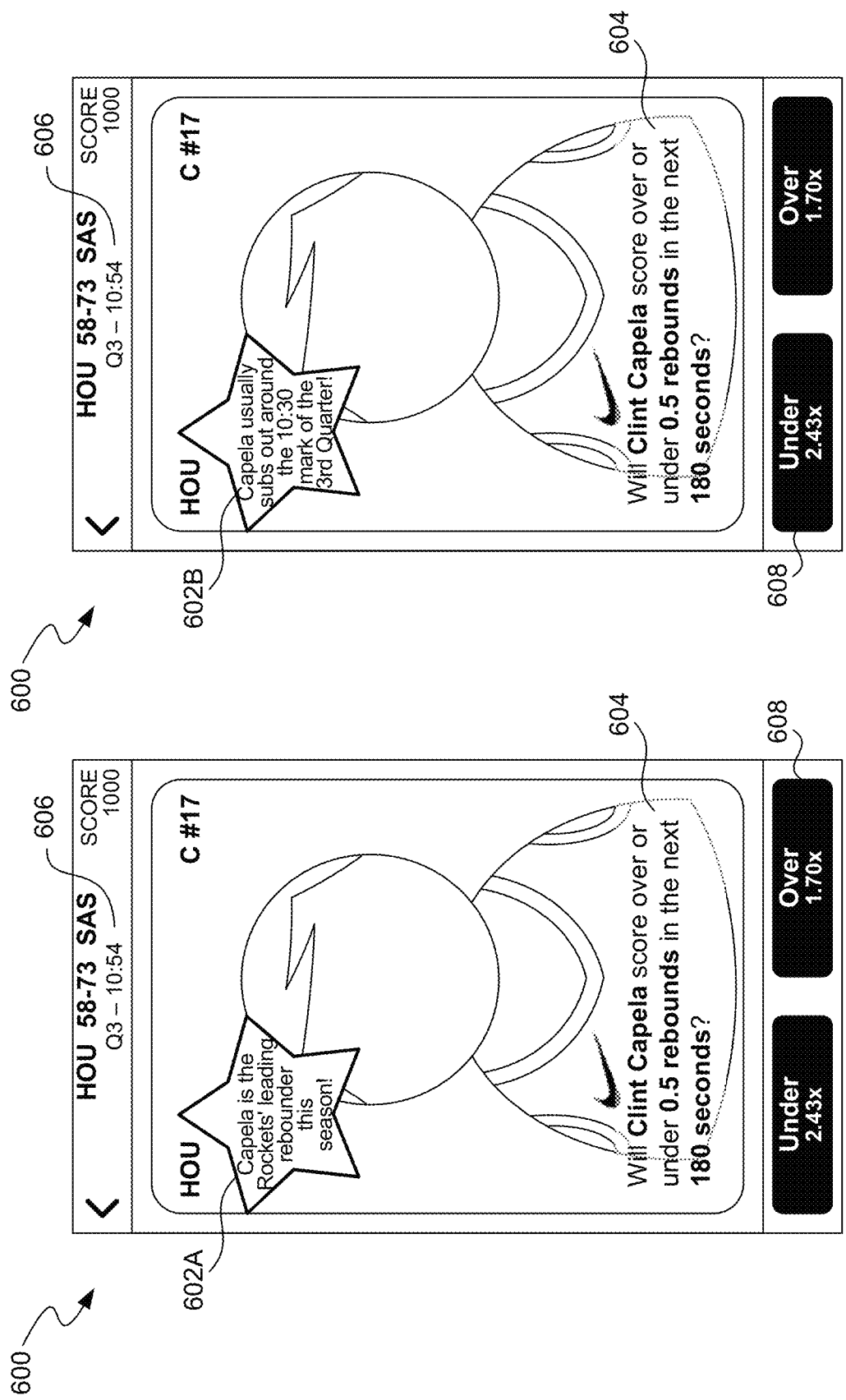

MACHINE LEARNING EDITORIAL PAIRING WITH PREDICTIVE QUERIES INFLUENCING USER BEHAVIOR

CROSS-REFERENCE TO RELATED APPLICATIONS

This application is a continuation-in-part of U.S. patent application Ser. No. 16/719,825, filed Dec. 18, 2019, which claims the benefit of the following provisional applications: U.S. Provisional Patent Application Ser. No. 62/914,963, filed Oct. 14, 2019; U.S. Provisional Patent Application Ser. No. 62/885,512, filed Aug. 12, 2019; and U.S. Provisional Patent Application Ser. No. 62/830,157, filed Apr. 5, 2019. The aforementioned applications are incorporated herein by reference in their entirety.

TECHNICAL FIELD

The disclosure relates to the continuous presentation of procedurally generated queries to users paired with editorial commentary.

BACKGROUND

Sportsbook betting is slow and based on pre-established queries originating before relevant athletic contests begin. For example, during the National Football League ("NFL") Super Bowl, often a number of proposition bets ("prop bets") are created long before the game begins and are unchanging while the game is in progress. There is a need to improve upon schemes in order to provide a more dynamic experience where betting queries are generated during games and based on the action that is happening as the game progresses.

BRIEF DESCRIPTION OF THE DRAWINGS

FIGS. 6A and B are illustrations of a user interface including statistical editorial comments.

DETAILED DESCRIPTION

Figure 1:
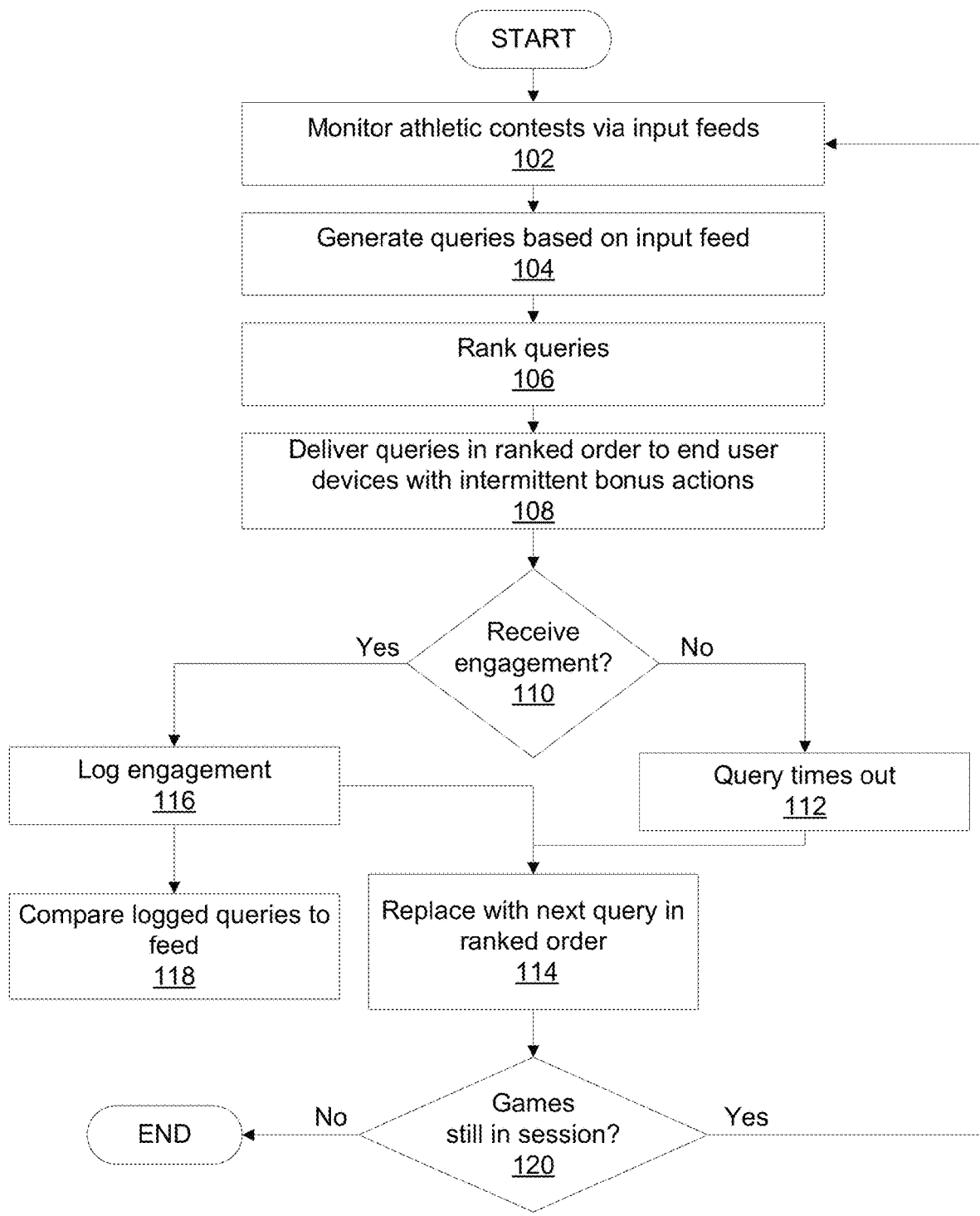
FIG. 1 is a flowchart illustrating an application flow.

Disclosed herein is an application enabling users to interface dynamically with live sports. During one or more athletic contests (multiple may occur simultaneously), the application receives input from a feed of the athletic contest (e.g., via a media feed or a gambling feed) describing events occurring in the given contest. From the contest feed input, the application generates a number of queries (e.g., Will Stephen Curry make a 3-point shot in the next two minutes? Will Tom Brady get sacked during his next drive? Will player X score points in the next Y minutes?) concerning the relevant contest(s). The queries are generated during the contests, preferably each second (~50 per second, per contest). A machine learning model operating on the backend of the application ranks the queries according to a set of criteria. Queries may then be delivered to users in ranked order.

In some embodiments, the queries operate on a binary basis (e.g., yes/no, this/that, or over/under). When presented with a query, the users may swipe on their user interface to indicate an answer to the query. In some embodiments, the user may answer "yes," or indicate disinterest in the query only. Queries pend on the user interface for a brief period (e.g., 10-30 seconds, or 15 seconds). Queries preferably operate in the time scale of minutes of game time. The queries concern game actions that may occur next, or soon in the relevant contest(s). When one query is resolved, either through user engagement or by expiring due to time lapse, a new query is presented to the user. Users who engage positively with queries that correctly predict mid-contest outcomes are awarded points, money or some other beneficial reward.

In some embodiments, each query is presented with some additional editorial content. The editorial content is designed to influence users to choose a target answer to the associated query. The editorial content may include details such as statistics about the relevant entity. For example, if the query is an over/under type question corresponding to Stephen Curry making 3-point shots in the next 3 minutes, then the editorial may have statistics about Stephen Curry's tendency to shoot and make 3-point shots. Where the target choice is that Curry achieves the over, the editorial may be "Stephen Curry is the leading 3-point shooter on the Warriors." Where the target choice is instead the under, then the editorial may be "Stephen Curry tends to sub out at X time," where the X time is less than 3 minutes away. Other examples of editorial may include graphics (e.g., an ice cube or a flame emoji), or factoids that have nothing to do with the athletic contest.

The editorial is paired with queries based on a machine learning model that indicates either a user base or a user specific tendency to choose the query engagement option that is beneficial to the platform. The model is trained with pairings of queries and editorial, along with the choices picked by various users for the given pairing. Over multiple iterations, the model becomes more accurate at guessing how a given editorial will influence the choices of the user when presented with a given query.

FIG. 1 is a flowchart illustrating an application flow. In step 102, a backend application server monitors one or more athletic contests (e.g., NFL games, National Basketball Association (NBA) games, Major League Baseball (MLB) games, National Hockey League (NHL) games, Major League Soccer (MLS) games, games in college leagues, games occurring in non-American leagues, international competitions, video games and e-sports, etc.) via an input feed(s) of all relevant athletic contests. The input feed describes events occurring in each contest (e.g., a play-by-play, stats crediting, game actions, notice of commercial breaks, etc.). When games occur simultaneously, within the same league or across leagues/sports, multiple feeds are monitored.

In step 104, the backend application server generates queries based on the input feed(s). In some embodiments the queries are yes/no format. In some embodiments, the queries are multiple choice. In some embodiments, the queries include short answer fields. The queries are procedurally generated based on conditions within each sports game being monitored via the input feed(s). Procedural generation of questions is performed by generating all permutations of a number of query formats that include a predetermined number of variables. In some embodiments, the system is configured to heuristically reduce the number of permutations (N) by filtering based on the game feed (e.g., values for variables that would refer to teams/players not playing are not generated). In some embodiments, queries are not actively generated and instead a pre-generated list of possible queries is repeatedly subjected to step 106 described below. Pre-generating queries removes computation time for step 104, and instead burdens the processing expense of step 106 below.

Queries may include permutations of, "Will player/team X perform game action Y, within Z time?" for all active games, each second of the game. The generated queries shift the variables to different possible values. In some embodiments, queries are generated for every possible permutation of variables. In the (X, Y, Z) example, the X value is for an actor (e.g., player(s), team(s), position(s) held by player(s)), the value of Y is for an action (e.g., score points, assist, takeaway, etc. . . . ), and the value for Z is a time component (e.g., absolute clock time, relative game clock time, or variable, but identifiable temporal segments like plays or ball possessions). In some cases, these values can have an associated magnitude. If the action component is points, the magnitude may be the number of points referred to in the query. If the time component is seconds, the magnitude may be the number of seconds.

The game actions are sport specific, for example, queries would not reference a baseball player when asking if the player would score a touchdown. Accordingly, the possible variables include assigned metadata that indicates which sport/team/position the player or action is associated with. In some embodiments, queries are only generated for feasible circumstances. For example, no query is generated for players whom are not actively present in the game (defensive players while the offense is on the field, bench players whom just left the court/rink/field), or players who are injured and out.

The sample queries provided above serve as illustrative examples and are not limiting on the query style/type. Queries may refer to multiple players, multiple teams or multiple actions. Each query includes a set of metadata. The metadata is based on any combination of the query style/type, the variables used within the specific query and the game state when the query is generated.

In step 106, a machine learning model operating on the backend application server ranks the queries according to a set of criteria. In some embodiments, the queries are ranked both on an application-wide level and again on a personal level. When individual users make choices to engage with a particular style of query (e.g., a user whom regularly engages with queries pertaining to scoring touchdowns), that engagement increases the rank of future queries with a similar style. Similarly, the users may apply specific filters to the queries, such as only to sports they are interested in (e.g., a user who has no interest in baseball can apply a filter to de-rank all baseball-related queries).

Queries are ranked on an application-wide level. Ranking of queries is based on a number of factors directed at targeting user "excitement." Queries that pertain to more popular players or more exciting actions are given a higher rank (e.g., asking whether the star player will score points is ranked higher than asking whether a less popular player assists on the score). In some embodiments queries are additionally ranked based on application-wide user engagement. The manner in which application-wide user engagement affects ranking of queries is based on the user reward structure of the application. In a betting scenario, if one query becomes over leveraged by the user base, the application may de-rank that query in order to reduce overall risk on that query, or up-rank the opposite side of the over-leveraged query in order to balance risk. If a given query is trending positively in engagement but the application is not overleveraged, the model up-ranks the query in order to place that query in front of more users. In a casual gameplay scenario where leverage of the house on a particular query is meaningless, positive trends in user-base engagement serve to up-rank the query.

In step 108, queries are then delivered to users, one at a time, in ranked order. The queries appear on a user device running a client instance of the application. In step 110, the instance of the application waits for engagement by a user. In step 112, where the user does not engage within a threshold period of time, the current query times out and is replaced with a new query in step 114. In step 116, where the user engages with a query, the user's stake/association with the query is logged and the logged query is replaced with a new query in step 114.

In step 118, logged queries are compared with the input feed for as long as they are active. Where the user correctly predicts game actions (via a logged query), the user is awarded the associated reward for being correct. In some embodiments, the reward is greater if the user was correct multiple times in a row. In step 120, the application determines if there are sports games still in session. If there are games in session, the process repeats.

Figure 2:
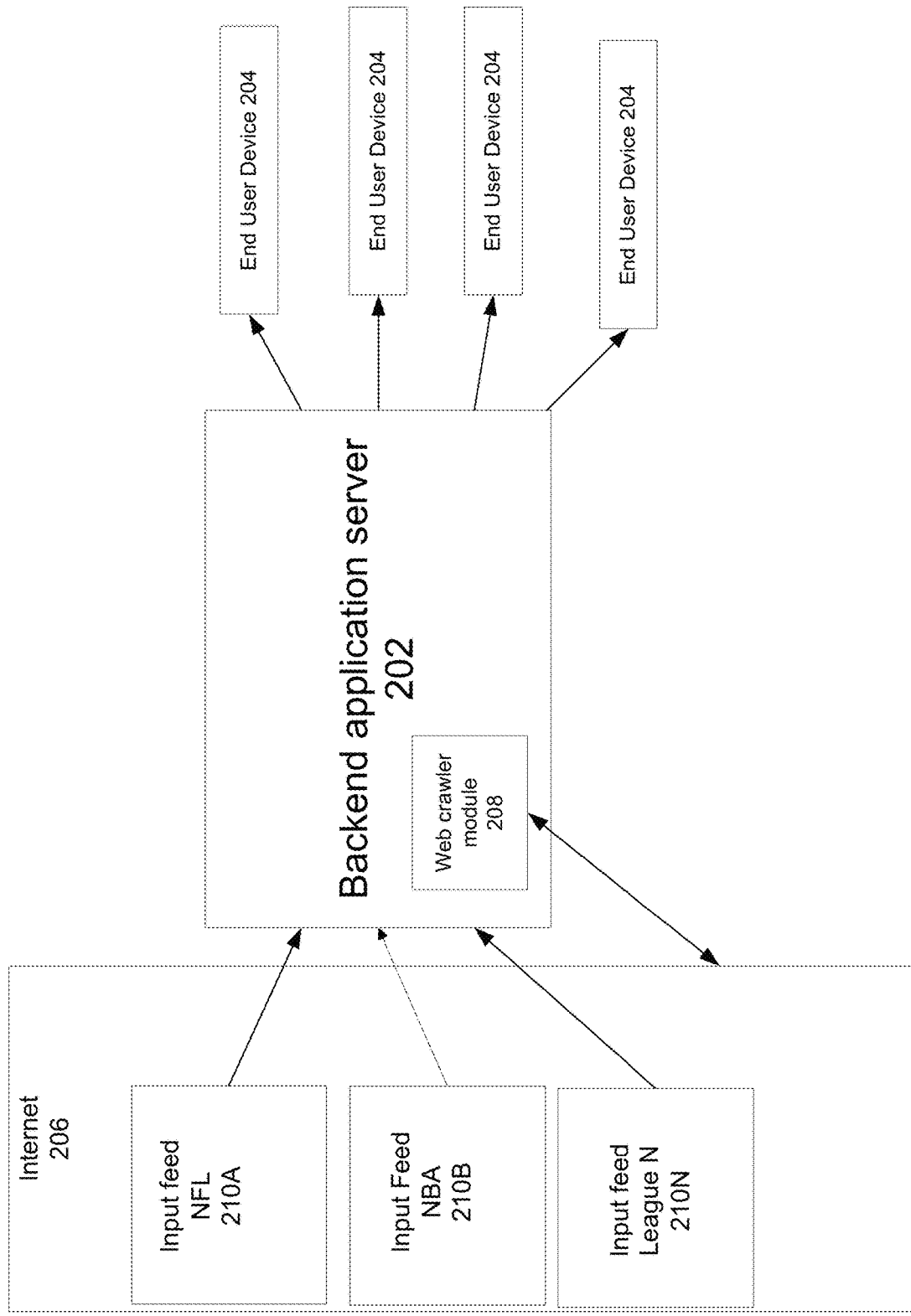
FIG. 2 is a block diagram illustrating a machine learning system executing a query ranking operation.

FIG. 2 is a block diagram illustrating a machine learning system 200 executing a query ranking operation. Query ranking is similar to generating a search rank in a search engine, where the search engine only operates with one question: "What is the best query in sports right now?" The machine learning system operates on a backend application server 202. The machine learning system may be constructed using multiple models. Examples of potential model architectures include hidden Markov models, convolutional neural networks, and deep learning networks. Each of the models may be supervised, unsupervised or semi-supervised. In some cases, pre-programmed artificial intelligence and heuristics operate to come to arrive at query ranks.

The backend application server 202 communicates directly with user devices 204 through client application software instances executing on the user devices 204. The client application software provides a graphic user interface for the individual users. Through the graphic user interface, users engage with queries supplied by the backend application server 202.

The backend application server 202 further communicates with the Internet 206 via web crawlers 208 that return data about websites to the backend application server 202 for processing. The backend server 202 further communicates with an input feed 210 that delivers up to the moment information about active athletic contests. In some embodiments multiple input feeds 210 originating from differing sources communicate with the backend server 202. The input feeds 210 corresponding to different games or different leagues may originate from different sources. In some embodiments the input feed 210 is a media feed provided by the relevant league to media outlets for the purpose of broadcasting content related to the athletic contest. In some embodiments the input feed 210 is a gaming or gambling feed used to provide information to gambling outlets concerning the outcome of athletic contests.

Factors that the machine learning models uses to evaluate that question include: game affinity, player statistical affinity, participant affinity (specific to that player-game relationship), end user affinity (personalization based on user's preference), operational affinity (features based on the house's goals), other user affinity or userbase affinity (a given user's behavior is similar to other users who may be categorized into archetypes or sub-archetypes either expressly or via training of a machine learning model), and competition affinity (specific to a user-competition relationship). Metadata associated with each query is used to evaluate as compared to the factors.

Game Affinity:

Game affinity refers to how much the particular game matters in sports. Users want to engage with queries related to games that are important. A playoff game, or a game against a rival, has higher priority than a regular season game. A game with a lopsided score, a game that is currently in intermission (halftime, commercial break, etc.), or a game that hasn't quite started yet are inherently less interesting and are de-ranked. Games that have current action are up-ranked. Games that have closer scores between teams are also up-ranked.

In some embodiments, game affinity factors operate on absolute binary data (e.g., intermission or not). In some embodiments, game affinity factors operate on a comparative basis (e.g., there is an indirect correlation between the gap in team score and the value the ranking engine assigns the game). In some embodiments, game affinity factors operate on a pre-determined value (e.g., a regular season game is worth same first value to the ranking engine, whereas a playoff game is worth some second, higher value to the ranking engine). The pre-determined values may be applied as multipliers or additives.

Player Statistical Affinity:

Player statistical affinity refers to the star power of a given player that a query is about. Each player across sports has an individual value as compared to players at large, players in the same position, players in the same age group, players from the same school, players from the same team, or players from another objectively defined group. The individual score is based on in-game statistics, media buzz, and user engagement. In some embodiments, the individual value is applied on a per-action basis (e.g., a player may have a higher value assigned to him/her when performing assists than scoring because he/she is known for that action).

In-game statistics may be objectively compared to one another on a one-to-one basis with matching statistic types. In some leagues/sports, there is an overall type statistic that is provided more weight than other statistics (e.g., hockey awards points for both goals and assists and football has a quarterback rating formula that is an amalgamation of multiple statistics). Some statistics are weighted as more impactful on the player's individual score in the query ranking system.

In some embodiments, players are assigned a Z-score that is used to evaluate the player rank. The Z-score operates cross-statistic and cross-sport. The Z-score is standardizes statistics of players relative to their peers within the league and then normalized between 0 and 1. To find the Z-score of a player, find the difference between a value for the player at a given statistic and the mean for that statistic at that player position, and divide the difference by the standard deviation for that statistic at that player position. Each Z-score is then scaled between 1 and 0 (e.g., $x\_new=(x-x\_min)/(x\_max-x\_min)$).

For example, if Player A produces rebounds at a rate of 0.30 per minute and Player B produces points at a rate of 1 per minute, then the Z-score transform turns these each into 0.95 and 0.91 respectively. The units for the Z-score are "statistical affinity" and may be applied evenly across all athletes and all sports. The ranking system is enabled to claim that Player A has a higher statistical affinity than Player B. The Z-score is applied inter-sport where the ranking system can compare Player C's yards per carry as a running back to both Player A and Player B's basketball statistics via pure statistical affinity.

Media buzz is identified on an objective basis. In some embodiments, a web crawler is used to identify the number of unique pages on the internet that reference the given player (or team). In some embodiments, audio recognition is applied to sports television (e.g., ESPN's SportsCenter) and instances of recitations of each player's name are tallied. Appearances on some websites or television programs are weighted more highly than others (e.g., reference on ESPN's homepage is weighted more highly than a forum associated with an unaffiliated blogger). The value of a given page over another can be configured on a predetermined basis or on an objective basis that evaluated how recently the page was authored/updated as well as how many times that page is referenced by other pages.

User engagement is identified as an ongoing statistic affected by users engaging with queries generated by the system. When a user engages with a query associated with a particular player (or team), that players engagement score goes up. In some embodiments, the engagement score applies to an overall query rank in a logarithmic or asymptotic manner. Because engagement drives further engagement, effecting a search rank/query rank score with a direct correlation or better (e.g., linearly, exponentially, etc.) causes a snowballing effect that can dominate the system. Statistics that are generated in-system and affect search rank within the system can lead to having too great an effect on the system.

User engagement may be further used to influence query type (as opposed to player choice). For example, where users of the system tend to engage with queries regarding a particular game action (e.g., whether a kicking team in football will recover an on-side kick), the system up-ranks queries for that action. Query type may also refer to whether the queries are yes/no, multiple choice or short answer. Query type may further refer to a risk/reward profile of the query. Queries may include a cost to engage with and reward some value of points based on a perceived likelihood of correctly predicting game events (e.g., scoring a safety in football is a relatively low occurring event, and thus, betting in favor of a safety has a higher risk). The opposite effect to rank is applied for when users allow a given query to time out and expire or send input that they are disinterested in that query. Queries that the user base does not engage with are down-ranked.

In some embodiments, queries regarding players on a hot streak for a given statistic are up-ranked. After the ranking system receives notifications from the input feed (indicating game status) that a given player has exceeded a threshold statistic accumulation in a threshold time, the ranking system determines that player is on a "hot streak" and up-ranks queries that ask users whether the hot streak will continue. In some embodiments, the existence of a hot streak modifies the magnitude for variables within a given query.

Participant Affinity:

Participant affinity relates to the manner in which the given player associated with the query relates to the game he/she is playing in. In some embodiments, the player is worth more to a ranking if the player is a starter or sees significant time playing as opposed to a bench player. Starting players are valued higher than substitutes, and substitutes are valued higher than substitutes of substitutes (e.g., third string).

When the player is injured (questionable, doubtful, out, etc.) the player is de-ranked as less exciting to the particular contest. When the player is actively on the field/court/rink/ring/octagon/sports playing area, that player is up-ranked. Similarly, when the player's team has possession of a relevant game element (e.g., a ball) the player is up-ranked as well as that player is more likely the subject of an exciting query. In the case where the player is a defensive player, not having possession of the relevant game element up-ranks the player instead (e.g., queries relating to defensive players like blocks and steals are more exciting when their team does not have possession).

End User Affinity (Personalization Based on User's Preference):

End user affinity refers to user specific effects on search/query rank that the user has an active role in influencing. The user can indicate to the application which sports he/she is most interested in and which players and teams he/she is interested in. User preferences may be applied as either a filter (e.g., removing all queries that do not match user preference) or a bias (e.g., providing additional weight to the rank of queries that match the user preference over other queries). User filters or biases may be configurable on a per sport or a per team basis. For example, a given user may be interested in all teams from the NFL, but only a single team in the NBA. While interested in all NFL teams, he/she may bias a particular team or set of players.

In some embodiments, end user affinity is further affected by the physical location of the user. A user located in a city where a given athletic contest is occurring up-ranks queries relating to that contest and players therein. Similarly to user engagement en masse, past engagement (or lack thereof) by a single user affects the query rank of future generated queries for that user. A given user may influence future system query ranking (for himself/herself) based on the relevant query type, players, teams or sports they engage with queries for. Through user actions, a user may generate filters or biases over time without expressly creating those filters or biases. Unlike actions en masse, there is no snowball problem when applying a direct correlation (or a more effective correlation) between an individual's engagement history to query ranking. Where a specific user prefers a certain method of engagement, enforcing that engagement pattern does not affect the engagement pattern of other users.

Operational Affinity:

Operational affinity relates to goals held by operators of the application server. For example, where "the house" is operating a betting scenario via delivered queries, it behooves the house to modify the factors by which queries are ranked. For example, in some embodiments, the house affects the ranking algorithm to minimize/maximize exposure on a given query. Should the user base win on a given query, the house does not want too great a percentage of the user base to be engaged in that query. The effect of the house's interest in a given query operates on a parabolic curve relating to user engagement. To a point, user engagement is encouraged. Once a certain position is reached (depending on size of the user base, and the percentage of the user base engaging with an opposite position or opposing position of a similar query), user engagement is discouraged. Conversely, a query that is structured in the opposite or is related and opposing becomes encouraged as the positive query is engaged with. Opposite may refer to a pair of queries that are the same with the exception of the word "not", "won't" or other negating terms. In some cases, an opposite query takes a position that is a mutually exclusive alternate of a position held by another query. The degree to which a given query is encouraged or discouraged in the ranking algorithm operates on the slope of the parabolic curve.

A query that is related and opposing is one that is not necessarily mutually exclusive but is unlikely in view of the success of another. For example, if a first query poses an over/under on the total score of a given game, a related query is the over/under on the number of points a given star player scores. That is if the star player does poorly, it is unlikely that the over on the total game points will be reached. Thus, the under on the total score of a given star player is related and opposing the over of the total score of the entire game.

In some embodiments, the ranking algorithm may be configured to push long shot queries (e.g., a query that is in favor of a given football team scoring 21 points in two minutes of game clock), or promotional incentives (e.g., application operator interest in a particular game). Promotional queries are generated through direct intervention by application administrators in the ranking algorithm.

Competition Affinity:

Competition affinity refers a given user's performance in correctly predicting game events as compared to other users. In some embodiments, users who engage with queries that result in correct predictions more often are provided additional rewards for "hot streaks" (with respect to the user, as opposed to athlete actions). In a given day, or other operative unit of time, system users are matched up on a leaderboard. Queries each have a risk and reward proposition associated with them. Users trying to catch the leader may have queries associated with a higher risk/reward profile up-ranked for them. Users in the lead may have queries associated with an even risk/reward profile up-ranked for them in order to maintain their position. As time remaining on a given leaderboard competition gets close to ending, queries that enable greater movement on the leaderboard are up-ranked. High risk/high-reward queries tend to lead to greater leaderboard movement and are accordingly up-ranked.

In some embodiments, leaderboards are configured based on physical location of users, where users whom are in the same geographic region are grouped together. Users within the same leaderboard up-rank queries that serve competitive balance between those users. Where users of a given leaderboard tend to engage with a particular query, that query is dynamically up-ranked so that other users associated with that leaderboard are presented that query.

Ranking Formula:

References to up-ranking and down-ranking in response to a given factor may be implemented as additive to a total rank score, or as a scalar to the total rank score or a portion of the rank score. The magnitude of an additive or scaler depends on weighting choices of a particular embodiment. Shifts in whether a given factor causes an up-rank or a down-rank may be influenced by absolute or dynamic thresholds regarding values held by those factors.

Magnitude Adjustment Feedback Loop:

The way users engage with queries further informs the magnitudes applied to future queries. A given query is "will player X, score Y points in Z time" and that query is offered with certain odds. The relevant magnitudes are the values of Y, Z, and the odds. Based on the number of users whom engage with a query at a certain set of magnitudes, the system may adjust the magnitudes to reduce or to increase engagement of future queries. Based on the given variable, and whether the goal is to increase or decrease engagement on a given query type, magnitudes are altered. For example, requiring more points before a predictive query is satisfied reduces engagement because the likelihood of predictive success is lower. Conversely, increasing the amount of time allotted for the prediction to come true increases engagement because the likelihood of predictive success is greater.

In some embodiments, the queries: "will player X score at least 5 points in 2 minutes?" and "will player X score at least 10 points in 2 minutes?" will rank the same in the ranking system. However, one would expect the engagement of the former query to be greater because the former query is objectively easier to satisfy. Based on target engagement goals, the magnitudes of future queries are adjusted. Because of the rate at which queries are generated and put into circulation in front of users, the feedback loop has a dynamic effect on the queries generated and presented. Traditionally sports betting activity readjusts on a per game basis. If one bet was over engaged with, magnitude adjustments do not go into effect until additional bets are decided for a following game (at least 24 hours later). The feedback loop disclosed herein enables updates to generated queries in time measured in seconds.

In some embodiments, magnitudes are further adjusted based on input feeds. If a given player is on a hot streak in their game, magnitudes for queries may be less generous towards the users engaging with the queries. "Generosity" is determined on a variable-by-variable basis depending on the sport and players involved in the query.

Figure 3:
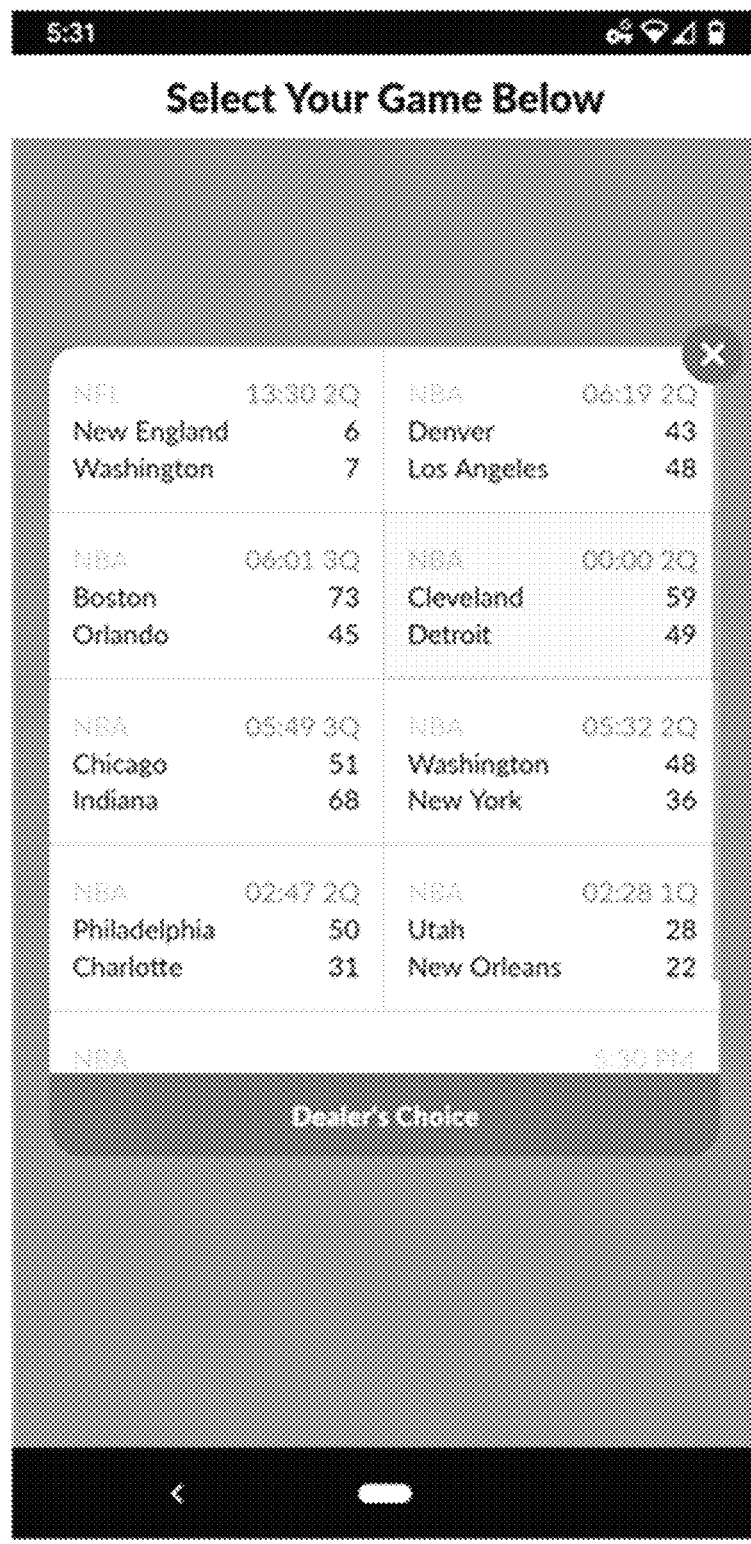
FIG. 3 is a screen shot of a query selection screen.

FIG. 3 is a screen shot of a query selection screen. Depicted in the screen shot is a menu that includes all active athletic contests presently occurring. A user may select a given contest from the menu in order to narrow the field of queries that they receive (e.g., queries directed to other contests are filtered out of the query ranking process). At the bottom of the menu, a "Dealer's Choice" button indicates a willingness to accept queries relating to any active contest. The menu indicates a current status of each contest and the relevant league.

Figure 4:
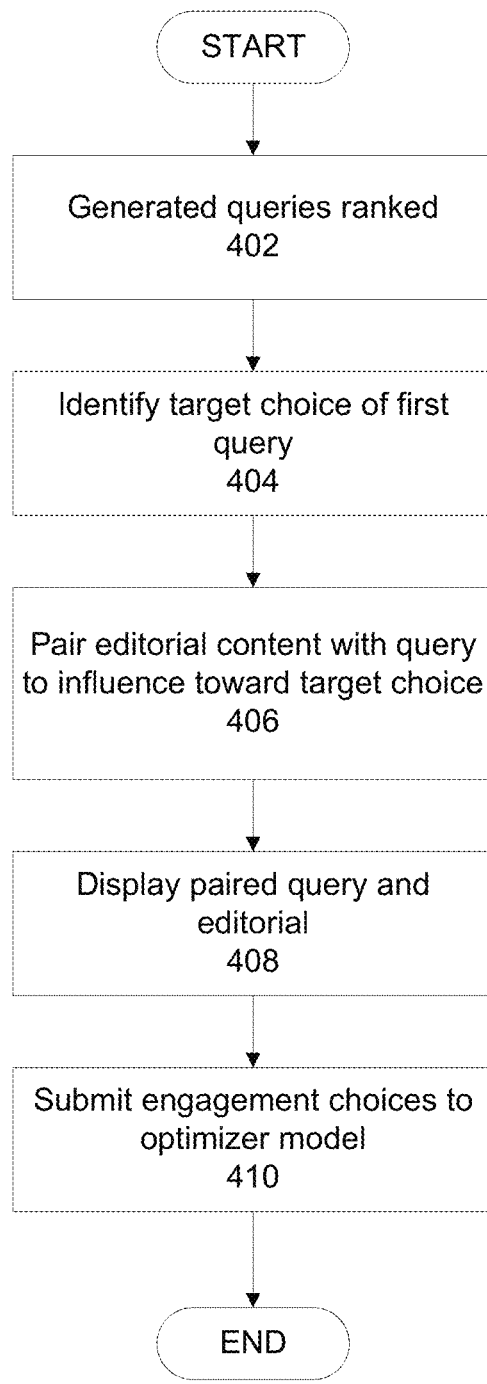
FIG. 4 is a flowchart illustrating insertion of editorial comments with queries.

FIG. 4 is a flowchart illustrating insertion of editorial comments with queries. During the course of serving queries to users, the system further pairs queries with editorial content. The editorial content is employed to influence users toward a particular or target response to the query. Target choices are determined in a number of ways. Examples of schemes to choose target queries include balancing out platform-wide risk in a betting scheme (e.g., where users have overwhelmingly chosen one option of a query, the platform is encouraged to have users chose another option) or encouraging users to take riskier or safer choices. Target choices improve the operational affinity of the platform in a manner that provides an advantage to "the house" and potentially influences users to make choices that are statistically against their interest.

In step 402, generated queries are ranked and prepared for presentation to a user in any embodiment described herein. In step 404, the platform identifies a target choice for the queries presented on either a per-user, user-group or user-base basis. The target choice may be decided either as a just-in-time determination for a current displayed query, or preemptively on all ranked queries in a given set of queries. When the target choice is determined just-in-time, the target choice may become varied or change based on what the previous target choice was, and how the user or user base responded en masse to editorial influence. The target choice is determined via operational affinity.

In step 406, the platform pairs editorial comments with the queries. In some embodiments, the content of the editorial comment is based on a history of user base query engagement that indicates that the content encourages users to choose the target choice from among multiple engagement choices of each query. In some embodiments the content of the editorial comment is categorized via meta tags associated with various editorial content. The meta tags associate procedurally generated editorial content with any of positive or negative sentiments, actor, action, or time components, magnitudes, and a frame of reference. A machine learning model (e.g., a hidden Markov model, a neural network, etc.) may use the meta tags for purposes of categorizing input/output.

Generation of the editorial comments is based on factual data stored in either an internal database or external reference database. The factual data is applied to a set of templates that are semantically comprehensible when variable strings based on the factual data are inserted into blank spaces.

In step 408, once paired, the editorial comments are displayed with the corresponding query influencing users toward engagement with the target choice.

Figure 5:
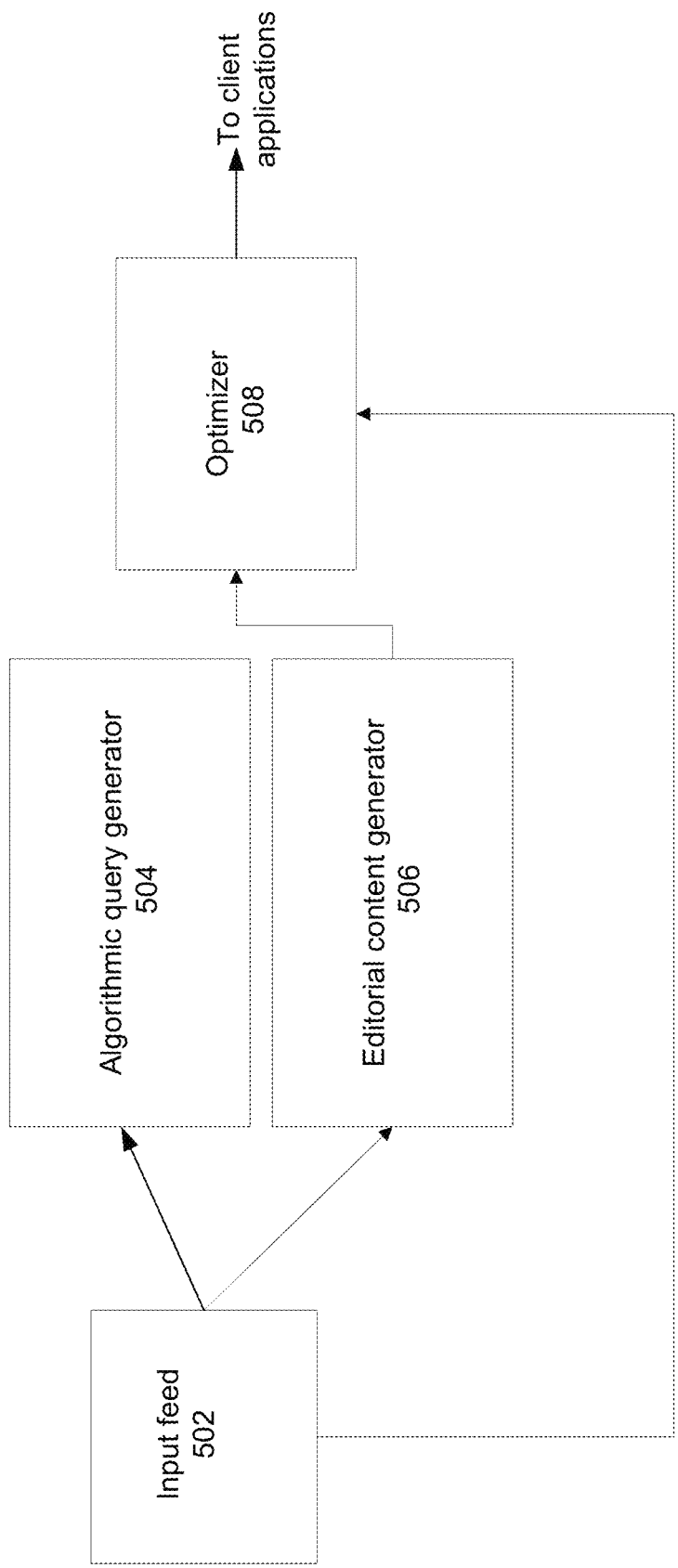
FIG. 5 is a block diagram of a user-tailored editorial content pairing platform.

FIG. 5 is a block diagram of a user-tailored editorial content pairing platform 500. The platform 500 includes a number of components including a live game-feed(s) 502, an algorithmic query generator 504, an editorial content generator 506, and an optimizer 508.

The live game-feed(s) 502 receive game updates of current athletic contests which are sufficiently rich as to enable the algorithmic/procedural creation of editorial content. The feeds 502 provide stats for each player and team involved in a given athletic contest. In some embodiments additional stats may be directly derived from raw feed data (e.g., comparisons between teams/players that are not currently playing each other). In some embodiments, data is scraped from the web in real-or-near-real time (e.g., a twitter crawler that puts up relevant tweets that have been algorithmically evaluated using sentiment analysis or other forms of natural language processing).

The algorithmic query generator 504 automatically generates queries and associated bets based on underlying game conditions, as well as one or more models generally built using advanced statistical techniques including, but not limited to, machine learning. The algorithmic query generator 504 takes as its inputs historical data, as well as information from live game-feeds. Various embodiments of the query generator are described above, herein.

The editorial content generator 506 communicates with the live game-feed 502 and implements historical data to generate a plurality of editorial content including, but not limited to, "factoids," "graphics." "relevant stats." and "trends." For example, it might generate a headline such as "Steph Curry is HOT tonight" based on the fact that Curry is converting shots at a rate above his career average in the ongoing contest. Whether that particular bit of content would be shown to a given user. is up to the optimizer 508.

The optimizer 508 intelligently blends the live game feed 502 with the output of the editorial content generator 506 to create an improved user experience. The intelligence of the optimizer 508 is based on any machine learning and/or heuristics.

The optimizer 508 evaluates a given user's behavior, as well as the overall risk profile of the platform/sportsbook, and sifts through the plurality of generated editorial content in order to (a) determine what type of content, if shown to the user, is most likely to generate additional engagement, and (b) what, if any, adjustments need be made in light of the current and desired risk profiles of the sportsbook. In the case of a betting feed (wherein a user is shown a subset of available bets at a time), the optimizer 508 may also help determine which bets are shown to the user in what order in addition to what editorial content (if any) is paired with each.

While a live event is underway, the algorithmic query generator 504 generates "raw" bets—bets that would be offered were the sportsbook to know nothing about the person to whom the bets will be shown. Meanwhile, the editorial content generator 506 begins generating a plurality of bits of content, which are classified into various bins (e.g., "Pro Warriors" "Steph Curry +" "Steph Curry −" based on the type of sentiment viewing such a piece of content is likely to generate in the user). The optimizer 508 (*a*) determines what sorts of bets the sportsbook would most like this user to make or engage with, and (b) searches the editorial content to find the content most likely to generate the desired user behavior. Finally, the user is shown the bet(s) and piece(s) of content, with the user's choice(s)—to engage or not, and to what degree—noted by the optimizer for future optimization. This cycle repeats on a per-user basis quite frequently, in some cases more than once per second (this cadence, itself, might be evaluated and optimized by the optimizer 508).

FIGS. 6A and B are illustrations of a user interface 600 including statistical editorial comments 602. Two separate statistical editorial comments 602A, B are displayed with the same query 604 (whether the presented player, Clint Capela, will achieve at least one rebound, expressed as an over/under prompt, in the next 180 seconds of game time).

A first statistical editorial comment 602A reads, "Capela is the Rockets' leading rebounder this season" and presents a player statistic, rebounds as compared to others, that leads a user to believe that the subject entity, Capela, will accomplish the "over" prompt.

Conversely, a second statistical editorial comment 602B reads, "Capela usually subs out around the 10:30 mark of the 3rd quarter." The second editorial comment 602B is based on current game status 606, which indicates that the athletic contest is currently at 10:54 in the third quarter. The second editorial comment 502B implies that the subject entity (again, Capela) is likely to leave the game in approximately 24 seconds and thus, may not be around for all of the time period that the query corresponds to. Thus, the second editorial comment 602B presents a player statistic, specifically a gameplay pattern, that leads a user to believe that the subject entity, Capela, will come in "under" the proposed number of rebounds.

Each example demonstrates how, in the same athletic contest circumstances 506, and with the same query 604, a different editorial comment 602A, B is applied that leads users toward a target conclusion 608 or engagement choice of the query 604 that is presented to them. The editorial comment applied in each case relates directly to the subject query 604. Specifically, the first editorial comment 602A directly refers to the action referred to in the query 504, rebounds, and the extent to which the acting player, Capela, performs that action. The second editorial comment 602B refers to the time component of the query 604—that is that the acting player may not be playing for the full time period allotted for the query 604.

In some embodiments, the statistical editorial comment 602 corresponds directly to any of the actor, action or time components. The statistics, while true, lead users to different conclusions. The editorial comments are determined based on a machine learning model that is trained on user base response to the comments. If the user base is more readily directed to a target choice by editorial comments that refer directly to the action in the query, then action based editorial comments will be employed more frequently.

The system procedurally generates statistical editorial comments 602 via any heuristics, templates, and sematic models that convey tone. The comments 602 are specific to the sport the subject query 604 relates to. FIG. 6 illustrates a query connected to NBA basketball and accordingly, includes references that are sport specific (e.g., subbing out, performing a rebound, etc.). In other sports, different templates are used that are based on the game status, and specific rules of the subject sport/game being played (e.g., in competitive e-sports, such as League of Legends, the statistics might be based on creep score, or a kills/deaths/assists ratio).

In some embodiments, the editorial comments are generated during the athletic contest (e.g., those based on how the current game has gone) and others are generated pre-game (e.g., those that pertain to season or career averages). As the system generates each editorial comment, they are flagged with numerous metatags. Examples of meta tags include the tone of the comment (e.g., positive or negative); whether the comment impacts the player, the action, or the time period (or some combination thereof); whether the action is related to other types of actions (e.g., assists and scoring plays are related); a frame of reference tag (e.g., indicating that a player averages 30 points a game is positive when asking whether a player whom has currently scored 10 will score more, and negative when then have scored 10 and the query asks whether there will be yet 10 more); or how convincing the given statistic is (e.g., a magnitude component—saying a player averages 30 points is inherently more convincing that they will score a lot of points than stating that they average at least 10 points). Meta tags may be used to categorize training data into the machine learning model or enable heuristics to sort and pair queries to comments more efficiently.

In some embodiments, the editorial comments are further determined based on individual user behavior in response to past query/editorial combinations. For example, particular users may act as a contrarian. Specifically, contrarian users will choose an engagement choice other than the one they believe the system is directing them toward. Thus, in order to get the contrarian to select the target engagement choice, the statistical editorial comment should appear to direct the user toward an alternate engagement choice.

Figures 7A, 7B:
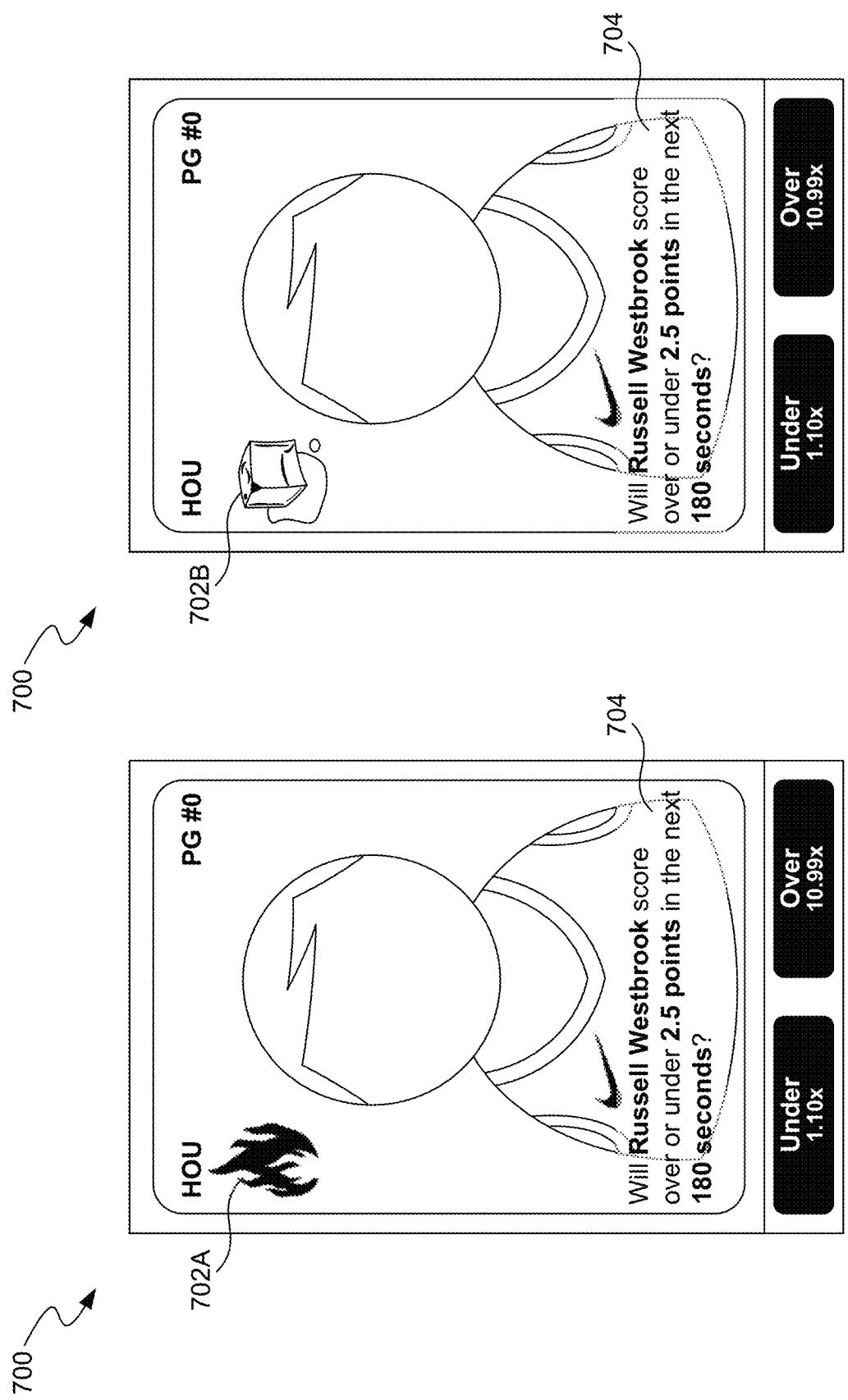
FIGS. 7A and B are illustrations of a user interface including graphic editorial comments.

FIGS. 7A and B are illustrations of a user interface 700 including graphic editorial comments 702. Two separate graphical editorial comments 702A, B are displayed with the same query 704 (whether the presented player, Russel Westbrook, will score 3 or more points, expressed as an over/under prompt, in the next 180 seconds of game time). Much like the statistical editorials, graphics can perform a similar function. Graphical editorial comments are selected from a premade list. Examples include the "fire" icon 702A and the "ice" icon 702B, each respectively indicating that a player/team is hot or cold. Other examples that convey a similar meaning may include a graphic of three buckets on fire or a toilet.

In some embodiments, the graphic editorial comments 702 are employed when the context of the athletic contest make very clear what the graphic implies. Among basketball fans, a player who is "on fire" is one who has made their last three shots. Thus, the context of the game matching the fan-meta meaning of the graphic causes users to understand and be influenced in engagement.

In other embodiments, the graphic editorial comments 702 have no fan-meta meaning and may have no inherent connection to the athletic contest at all (e.g., a graphic of a sombrero, a graphic of a prism, or a graphic of a banana). For graphic editorial 702 with no fan-meta meaning, the system runs experiments to train the machine learning model. Initially, the experiments arbitrarily employ the graphics with no fan-meta meaning and observe the results. Eventually, if the user base, or even individual users. demonstrate a query engagement trend/sentiment when shown a particular graphic (e.g., if users whom are shown the banana graphic tend to take the over, or a riskier option), the machine learning model will employ that graphic to influence users toward a target choice.

Figure 8:
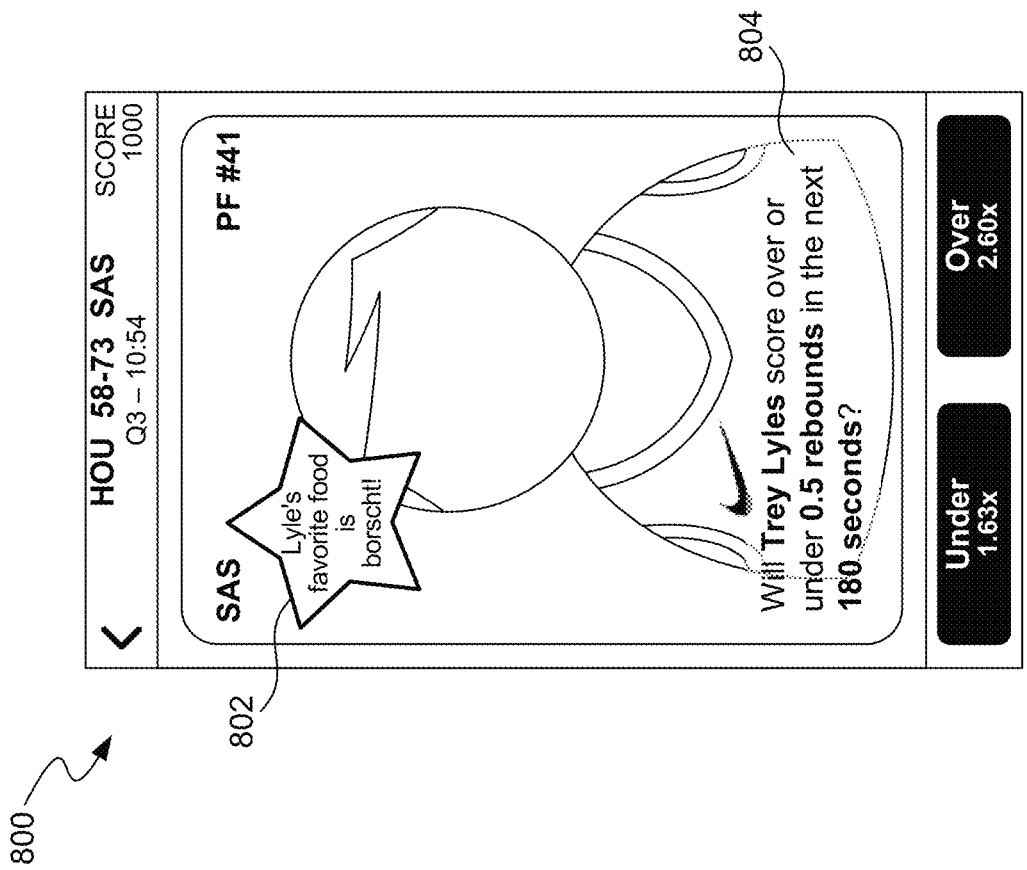
FIG. 8 is an illustration of a user interface including non-athletic editorial comment.

FIG. 8 is an illustration of a user interface 800 including non-athletic editorial comment 802. Similar to the graphic editorial that does not have a fan-meta understanding, textual editorial that is not athletic or not directly connected to the athletic contest may be employed initially via experiments and subsequently in a targeted fashion. Pictured in the Figure is the non-athletic editorial comment 802 that "Lyles' favorite food is borscht!" This non-athletic editorial is paired with an over/under query about rebounds 804. There is no rational connection between liking borscht and making a rebound in 3 minutes of game time.

After conducting experiments and identifying a tendency of the user base or a particular user to respond to apparently random factoids or specifically borscht related content, the machine learning model begins to pair the non-athletic editorial comment 802 with queries to influence users toward a target choice.

Figure 9:
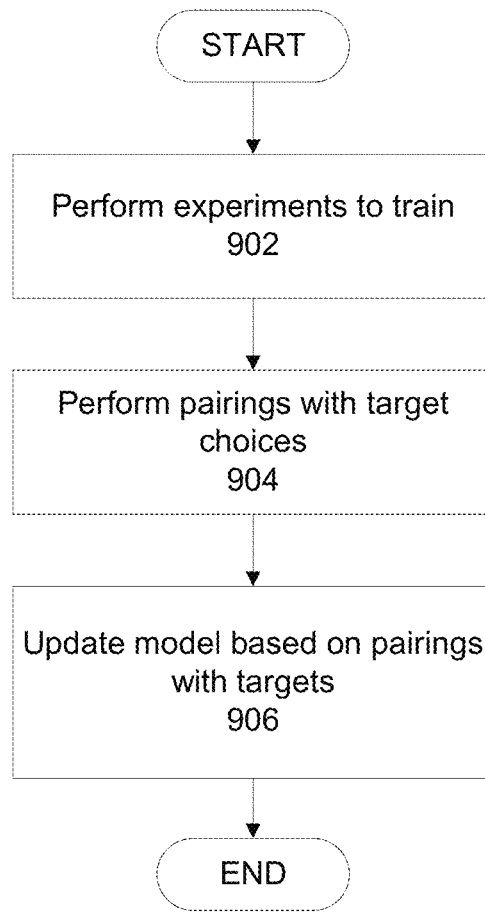
FIG. 9 is a flowchart illustrating operation of a machine learning model that pairs queries with editorial content.

FIG. 9 is a flowchart illustrating operation of a machine learning model that pairs queries with editorial content. The machine learning model is trained via initial experiments and ongoing platform use. The pairing machine learning model reviews a number of various factors and outputs a pairing of an editorial content, a query and a user.

In step 902, the machine learning model performs a series of experiments based on a set of queries delivered to individual users. In some embodiments, the experiments arbitrarily pair editorial content with queries according to heuristically identified relationships/*nexus* between the editorial and the queries (e.g., such as through matching meta tags between the queries and editorial). If the experiment was conducted using a hidden Markov model, the query, the user and the editorial are all states whereas the user response or engagement choice is the emission. Once the user selects a given engagement choice, the experiment is logged. The experiments inform results for both the individual user as well as how users react overall.

Over the course of many iterations of the experiment, the model develops associations between various editorial content and queries in a manner that develops computational predictive confidence toward how a specific user, or a generic user will engage with a given query based on display of a specific editorial content.

In some embodiments, the states are even more granular and take into account where the user lives, what teams the user favors, or how many times similar editorial content had previously been shown to that user. It may be the case that after conducting a sufficient number of the experiments that a trend appears that New England Patriots fans are found to be contrarians and tend to pick the engagement choice opposite to what the platform appears to be directing the user to.

In step 904, after experiments have been conducted and a model is trained, the model pairs editorial content with queries, but this time basing the pairing on a target engagement option.

In step 906, the model receives the emission from the user from the pairing in step 904 and updates the training data to include the new instance.

Figure 10:
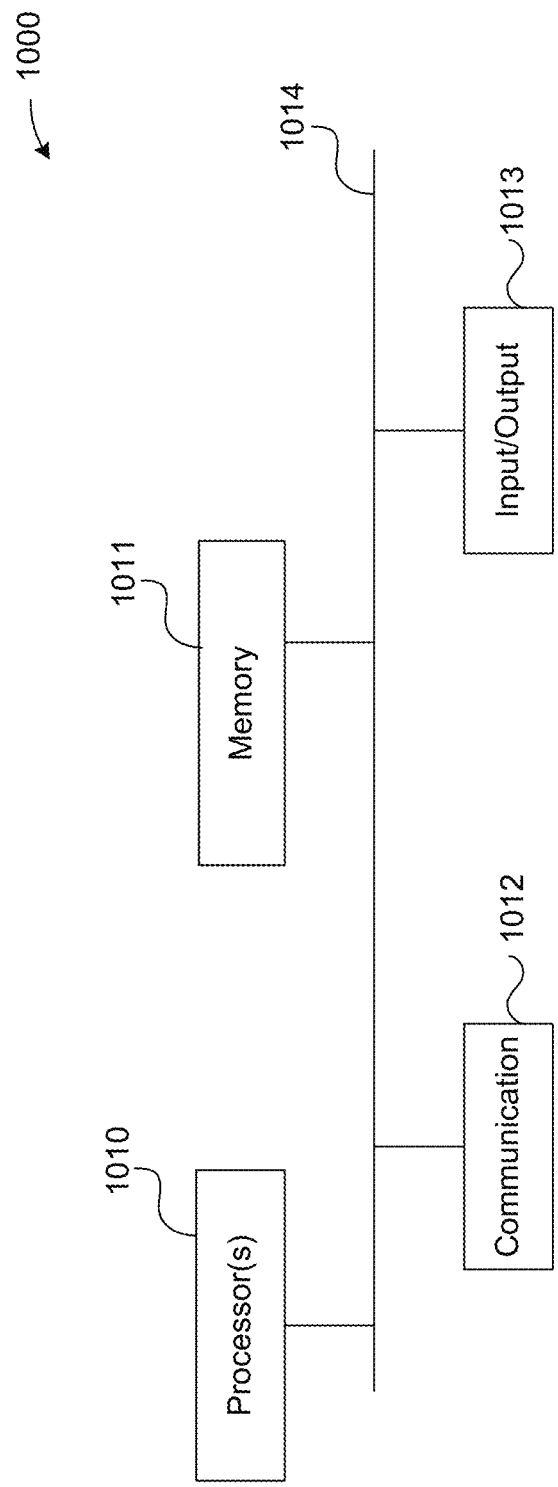
FIG. 10 is a high-level block diagram showing an example of a processing device that can represent a system to run any of the methods/algorithms described above.

FIG. 10 is a high level block diagram showing an example of a processing device 1000 that can represent a system to run any of the methods/algorithms described above. A system may include two or more processing devices such as represented in FIG. 6, which may be coupled to each other via a network or multiple networks. A network can be referred to as a communication network.

In the illustrated embodiment, the processing device 1000 includes one or more processors 1010, memory 1011, a communication device 1012, and one or more input/output (I/O) devices 1013, all coupled to each other through an interconnect 1014. The interconnect 1014 may be, or include, one or more conductive traces, buses, point-to-point connections, controllers, scanners, adapters and/or other conventional connection devices. Each processor 1010 may be, or include for example, one or more general-purpose programmable microprocessors or microprocessor cores, microcontrollers, application specific integrated circuits (ASICs), programmable gate arrays or the like, or a combination of such devices. The processor(s) 1010 control(s) the overall operation of the processing device 1000. Memory 1011 may be, or include, one or more physical storage devices which may be in the form of random access memory (RAM), read-only memory (ROM) (which may be erasable and programmable), flash memory, miniature hard disk drive or other suitable type of storage device, or a combination of such devices. Memory 811 may store data and instructions that configure the processor(s) 1010 to execute operations in accordance with the techniques described above. The communication device 1012 may be or include, for example, an Ethernet adapter, cable modem, Wi-Fi adapter, cellular transceiver, Bluetooth transceiver or the like, or a combination thereof. Depending on the specific nature and purpose of the processing device 1000, the I/O devices 1013 can include devices such as a display (which may be a touch screen display), audio speaker, keyboard, mouse or another pointing device, microphone, camera, etc.

Unless contrary to physical possibility, it is envisioned that (i) the methods/steps described above may be performed in any sequence and/or in any combination, and (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method of executing a query engagement engine comprising:
   generating a plurality of queries during a contest, each query based on a real-time status of the contest and having multiple associated engagement choices from which a user is enabled to make a selection;
   generating the editorial commentary based on a history of user based query engagement that indicates that the editorial commentary correlates to a likelihood that users choose a target choice of the multiple associated engagement choices, such that the editorial commentary is tailored to influence the user's selection from the multiple associated engagement choices;
   automatically pairing each said query with editorial commentary; and
   displaying each query and respective associated engagement choices and editorial commentary on a graphical user interface that is configured to receive user input corresponding to the user's selection.

2. The method of claim 1, further comprising:
   indicating, by a machine learning model, that there is a correlation between the editorial commentary and user selection of the target choice based on the history of user base query engagement.

3. The method of claim 2, wherein the history of user base query engagement includes user archetypes and the correlation between the editorial commentary and user selection of the target choice is performed on a user-to-user basis and based on a first archetype that a subject user belongs to.

4. The method of claim 1, wherein the editorial commentary includes statistics relating to an entity referred to in a respective paired query.

5. The method of claim 4, wherein the multiple associated engagement choices of a first query of the plurality of queries are a binary choice regarding whether a predicted event will occur in the contest and the statistics are framed to indicate a positive likelihood of a target choice of the binary choice occurring.

6. The method of claim 1, wherein the editorial commentary is an isolated graphic.

7. The method of claim 1, wherein the editorial commentary includes non-contest information relating to an entity referred to in the displayed query.

8. The method of claim 1, further comprising:
   determining the target choice of a first query of the plurality of queries for the first user based on how other users have engaged with the first query.

9. The method of claim 1, wherein the editorial commentary corresponds to the real-time status of the contest.

10. The method of claim 1, further comprising:
    receiving the selection on the multiple associated engagement choices of a first query of the plurality of queries from a first user; and
    updating an engagement profile of the first user based on whether the selection from the first user matches the target choice, wherein said pairing for the first user is further based on the engagement profile of the first user.

11. The method of claim 2, further comprising:
    training the machine learning model with training data, wherein the training data includes the history of user-base query engagement, each instance of training data includes:
    a pairing of a past query and a past editorial comment; and
    whether an active user had engaged with the target choice or not.

12. A method of executing a query engagement engine comprising:
    generating a plurality of queries during a contest, each query based on a real-time status of the contest and having multiple associated engagement choices from which a user is enabled to make a selection, the multiple associated engagement choices corresponding to predictive results of the athletic contest connected to a first entity participating in the contest;
    generating the editorial commentary based on a history of user base query engagement that indicates that the editorial commentary correlates to a likelihood that users choose a target choice of the multiple associated engagement choices, wherein the editorial commentary includes statistics connected to the first entity automatically pairing each said query with editorial commentary that is tailored to influence the user's selection from the multiple associated engagement choices toward the target selection; and
    displaying each query and respective associated engagement choices and editorial commentary on a graphical user interface that is configured to receive user input corresponding to the user's selection.

13. The method of claim 12, wherein the multiple associated engagement choices of a first query of the plurality of queries are a binary choice regarding whether a predicted event will occur in the contest and the statistics are framed to indicate a positive likelihood of a target choice of the binary choice occurring.

14. The method of claim 12, further comprising:
determining the target choice of a first query of the plurality of queries for the first user is generated based on how other users have engaged with the first query.

15. The method of claim 12, further comprising:
determining the target choice of a first query of the plurality of queries based on a projected odds of the target choice occurring as compared to other choices of the multiple associated engagement choices.

16. The method of claim 12, further comprising:
receiving the selection on the multiple associated engagement choices of a first query of the plurality of queries from a first user; and
updating an engagement profile of the first user based on whether the selection from the first user matches the target choice, wherein said pairing for the first user is further based on the engagement profile of the first user.

17. The method of claim 12, wherein said pairing is further based on a machine learning model, and the method further comprising:
indicating, by a machine learning model, that there is a correlation between the editorial commentary and user selection of the target choice based on the history of user base query engagement; and
training the machine learning model with training data, wherein the training data includes the history of userbase query engagement, each instance of training data includes:
a pairing of a past query and a past editorial comment; and
whether an active user had engaged with the target choice or not.

18. A system of executing a query engagement engine comprising:
a network interface configured to communicate with an athletic contest descriptive feed and identify a real-time status of a contest;
a backend application server including a first memory, the memory including instructions that when executed cause the backend application server to:
generate a plurality of queries during the contest, wherein each query of the plurality of queries is based on the real-time status of the contest and having multiple associated engagement choices from which a user is enabled to make a selection, the backend application further configured to automatically pair each said query with editorial commentary that is tailored to influence the user's selection from the multiple associated engagement choices; and
generate the editorial commentary based on a history of user base query engagement that indicates that the editorial commentary correlates to a likelihood that users choose a target choice of the multiple associated engagement choices; and
a client application configured to operate on mobile devices and correspond with the backend application server via the network interface, the client application further configured to display each query and respective associated engagement choices and editorial commentary on a graphical user interface that is configured to receive user input corresponding to the user's selection.

19. The system of claim 18, wherein the memory further includes instructions that when executed cause the backend application server to:
receive the selection on the multiple associated engagement choices of a first query of the plurality of queries from a first user; and
update an engagement profile of the first user based on whether the selection from the first user matches a target choice, wherein said pairing for the first user is further based on the engagement profile of the first user.

20. The system of claim 18, further comprising:
a machine learning model that indicates that there is a correlation between the editorial commentary and user selection of the target choice based on the history of user base query engagement and informs the automatic pairing by the backend application server, the machine learning model including training data, wherein the training data includes the history of userbase query engagement, each instance of training data includes:
a pairing of a past query and a past editorial comment; and
whether an active user had engaged with the target choice or not.

21. The system of claim 18, wherein the editorial commentary includes statistics relating to an entity referred to in a respective paired query.

22. The system of claim 18, wherein a target choice of the multiple associated engagement choices of a first query of the plurality of queries is determined for a first user based on how other users have engaged with the first query.

* * * * *